United States Patent [19]

Oda et al.

[11] Patent Number: 4,763,155
[45] Date of Patent: Aug. 9, 1988

[54] SHUTTER CONTROL DEVICE FOR CAMERA

[75] Inventors: Hajime Oda; Hiroyuki Saito; Keiji Arai; Atsushi Misawa; Toshiya Tamura; Michio Taniwaki; Katsuhito Niwa, all of Yotsukaido, Japan

[73] Assignee: Seikosha Co., Ltd., Tokyo, Japan

[21] Appl. No.: 4,140

[22] Filed: Jan. 13, 1987

[30] Foreign Application Priority Data

Jan. 13, 1986 [JP] Japan ................................. 61-4494
Feb. 21, 1986 [JP] Japan ................................. 61-36782

[51] Int. Cl.[4] .......................................... G03B 7/097
[52] U.S. Cl. .................................................. 354/435
[58] Field of Search .............................. 354/435–437,
354/439, 456, 234.1, 230, 458–464; 352/180

[56] References Cited

U.S. PATENT DOCUMENTS 4,322,145 3/1982 Yamada et al. .................... 354/435
4,462,672 7/1984 Kurosu ......................... 354/458 X Primary Examiner—W. B. Perkey
Attorney, Agent, or Firm—Bruce L. Adams; Van C. Wilks

[57] ABSTRACT

A camera has a shutter device driveable to undergo opening movement to open an aperture to effect exposure operation according to a given exposure value, and a motor actuatable to rotate at an unstable rotational speed for driving the shutter device. A detector operates after the motor starts rotating and before the shutter device undergoes its opening movement for detecting the rotational speed of the motor. A controller adjusts the shutter device in accordance with the detected rotational speed of the motor to thereby enable the shutter device to effect the exposure operation so as to accurately achieve the given exposure value.

21 Claims, 6 Drawing Sheets

SHUTTER CONTROL DEVICE FOR CAMERA

BACKGROUND OF THE INVENTION

1. Field of the Invention:

The present invention relates to a constant-velocity driving arrangement for a camera shutter of the type in which a sector is driven by a motor.

2. Description of the Prior Art:

Camera shutters capable of performing many various exposure modes by driving a sector with a motor are put to practical use. Since a battery is used as a motor driving power supply, the speed of travel of the sector tends to change due to variations in the battery voltage, resulting in errors in the amount of exposure.

Shutter devices of the type in which a sector is driven by a motor are widely used in camera electronically controlled. Such a shutter device can perform many various exposure modes, but is problematic in that the exposure accuracy is poor since the rotational speed of the motor depends on the voltage of a battery which is a source of drive energy for the shutter device. To solve the above problem, it has been customary to provide a higher battery voltage setting than the rated voltage of the motor, and to supply a constant voltage to the motor through a constant-voltage circuit that utilizes the conduction resistance of a transistor. However, when the voltage of the battery is high, the drive voltage is lowered by the constant-voltage circuit, and hence the battery power is consumed as Joule heat resulting in a shortened battery service life, and an excessive margin is required for the power supply voltage.

SUMMARY OF THE INVENTION

In view of the aforesaid problems of the conventional shutter devices, it is an object of the present invention to provide a shutter control circuit capable of supply a shutter driving motor with pulsed electric power and capable of varying the duty cycle of the pulsed power according to the rotational speed of the motor for more efficient utilization of the battery power to drive the motor at a constant speed.

According to the present invention, there is provided a device for controlling the rotational speed of a shutter driving motor for a camera, including means for detecting the rotational speed of the motor which drives a sector, and means for varying the duty cycle of the motor according to the detected rotational speed.

In view of the aforesaid problems of the conventional camera shutters, it is another object of the present invention to provide a shutter control device for cameras which is capable of effecting fine adjustment of a shutter aperture closing time according to the time measured after operation of the motor to open a shutter until the shutter starts to be opened, so that a correct amount of exposure can be obtained irrespective of the voltage of a battery.

According to the present invention, there is provided a device for controlling a camera shutter comprising means for detecting a time interval after a shutter driving motor has started to rotate until a sector is opened, correcting means for correcting an amount of exposure based on the detected time interval, and means for determining a shutter aperture closing time according to a signal from the correcting means.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 4:
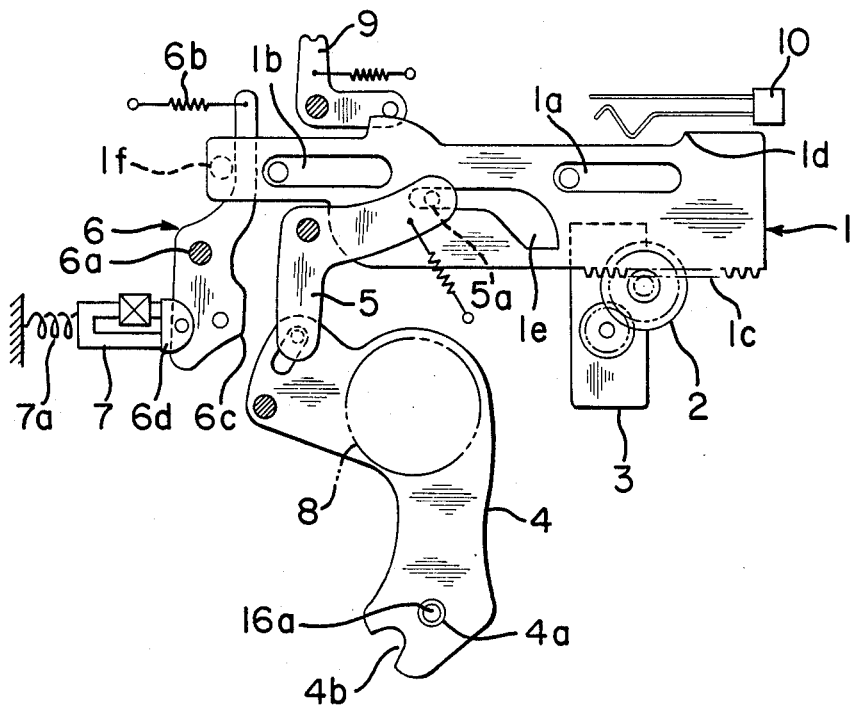
FIG. 4 is a plane view of a shutter mechanism to which the present invention is applied.

FIG. 4 shows a shutter mechanism to which the present invention is applied. The shutter mechanism includes a drive plate 1 movably mounted by pins on a fixed base plate (not shown) through slots 1a, 1b formed in the drive plate 1. The drive plate 1 has a rack 1c meshing with a pinion 2 for receiving a driving force from rotary means in the form of a drive motor 3, and a projection 1d for closing a switch 10 which selects, at a time, one of a focusing mode and an exposure mode. The drive plate 1 also has a cam grove 1e for rendering a sector 4 to turn through a non-operative region without opening the aperture in the focusing mode and for turning the sector 4 through an operative region dependent on the interval of travel of the drive plate 1 to carry out the exposure operation, the cam groove 1e being composed of a horizontal portion extending in the direction in which the drive plate 1 is movable and an oblique portion contiguous to the horizontal portion. The sector 4 covers an aperture opening 8 and is operatively coupled to a sector lever 5 which support on the arm end thereof a pin 5a inserted in the cam groove 1e. The sector 4 may be plural.

A shutter closing lever 6 is angularly movably mounted on the fixed base plate by means of a shaft 6a and is normally urged by a spring 6b to turn counterclockwise about the shaft 6a. The shutter closing lever 6 has a projection 6c disposed on one lower side thereof and facing the selector lever 5. An attractable member 6d is mounted on the other lower side of the shutter closing lever 6 and is attractable by an electromagnet 7 that is swingably mounted on the fixed base plate through a spring 7a. When the drive plate 1 is in a home position, an upper portion of the shutter closing lever 6 is turned clockwise by a pin 1f on the drive plate 1 to allow the attractable member 6d to be attracted to the electromagnet 7. When the electromagnet 7 is de-energized, the shutter closing lever 6 is turned counterclockwise under the resiliency of the spring 6b to cause the projection 6c to actuate the sector lever 5 counterclockwise, thereby closing the sector 4.

The sector 4 has a through hole 4a defined in one end thereof. The hole 4a is positioned such that when the sector 4 is stopped in its closed position, the hole 4a registers with a light detector 16a for measuring the brightness of an object to be photographed. The sector 4 also has a recess 4b which registers with the light detector 16a when a shutter aperture starts to be formed. A rangefinder device includes a scanning member 9 which is angularly movable by a slanted surface on an upper edge of the drive plate 1.

Figure 1:
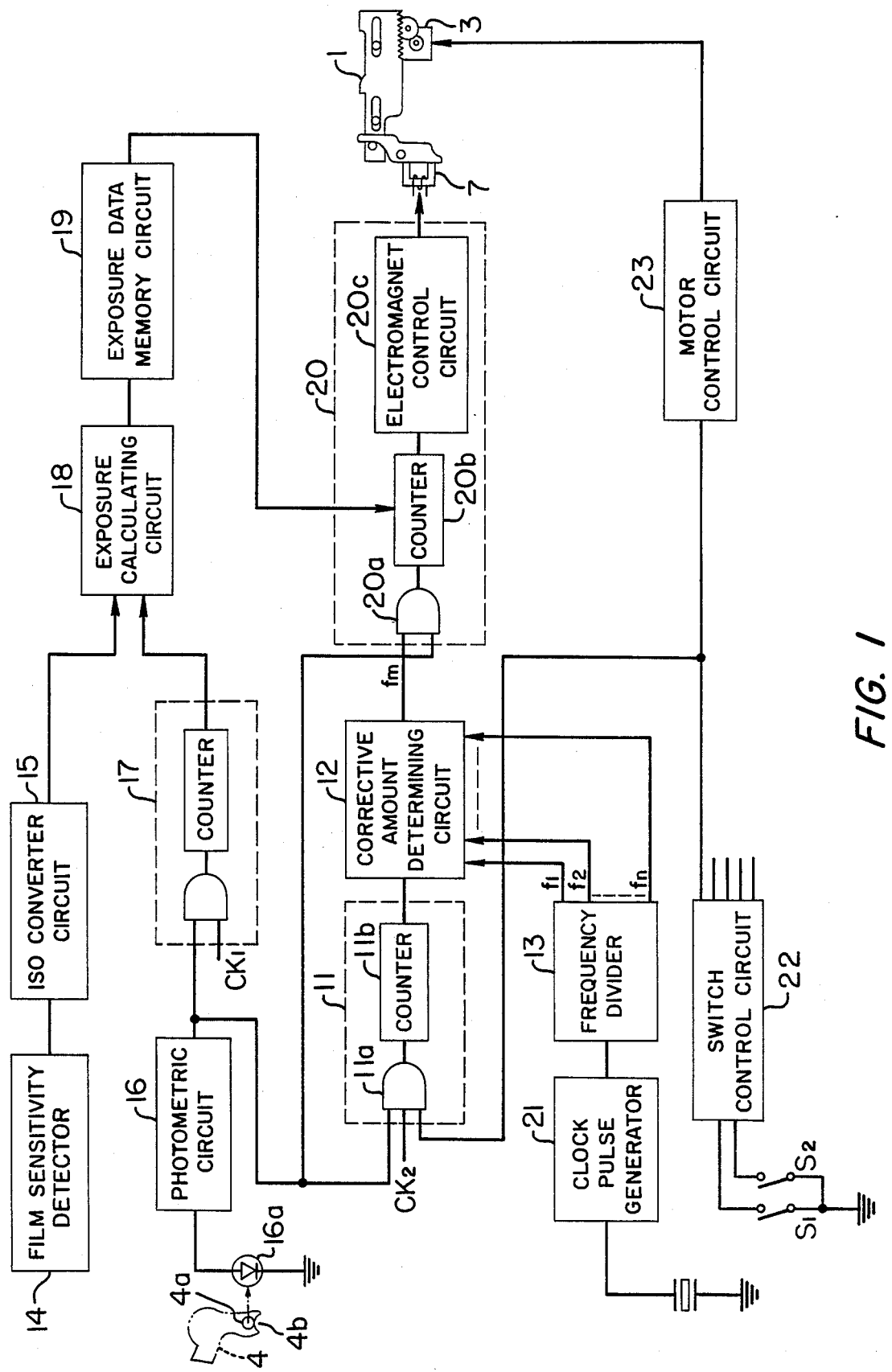
FIG. 1 is a block diagram of a shutter control device according to the present invention.

FIG. 1 shows a shutter control device according to the present invention. The shutter control device has a circuit 11 for measuring a sector opening time, the circuit 11 including an AND gate 11a receptive of a shutter opening signal, a clock signal CK2, and a signal from a photometric circuit 16, and a counter 11b for counting the clock signal CK2 fed from the AND gate 11a. The circuit 11 operates to detect a time $\Delta T$ required for the recess 4b of the sector 4 to move to a position registering with the light detector 16a after a the shutter opening signal has been issued to initiate the sector 4 to open the aperture. A corrective amount determining circuit 12 selects one frequency fm out of a plurality of frequencies f1, f2, ... fs ... fn supplied from a frequency-divider circuit 13 based on the time $\Delta T$, and supplies the selected frequency fm as a clock signal to a shutter aperture closing control circuit 20. An exposure calculating circuit 18 calculates an amount of exposure EX based on film sensitivity data from a film sensitivity detecting circuit 14 and object brightness data from the photometric circuit 16, and provides an access signal to an exposure data memory circuit 19 based on the calculated exposure amount EX. The exposure data memory circuit 19 has exposure amounts EX1, EX2, ... EXn as addresses and stores, as data, shutter closing times D1, D2, ... Dn (see Table 1 below) corresponding to the exposure amounts, respectively.

TABLE 1

| Address | EX1 | EX2 | EX3 | ... | ... | EXn |
|---|---|---|---|---|---|---|
| Data | D1 | D2 | D3 | | | Dn |

A shutter aperture closing control circuit 20 includes an AND gate 20a which is opened to pass clock having frequency fm from the corrective amount determining circuit 12 in response to a signal issued from the light detector 16a upon completion of a photometric process, a presettable counter 20b for setting a shutter closing time from the exposure data memory circuit 19, and an electromagnet control circut 20c for de-energizing the electromagnet 7 in response to counting-up of the presettable counter 20b.

An ISO converter circuit 15 converts the film sensitivity into an ISO value. An analog-to-digital converter 17 converts a photometric signal into a corresponding digital signal. A clock pulse generator 21 generates clock pulses applied to the frequency-divider circuit 13. A motor control circuit 23 drives the motor 3 in response to a shutter opening signal from a switch control circuit 22.

Figure 2:
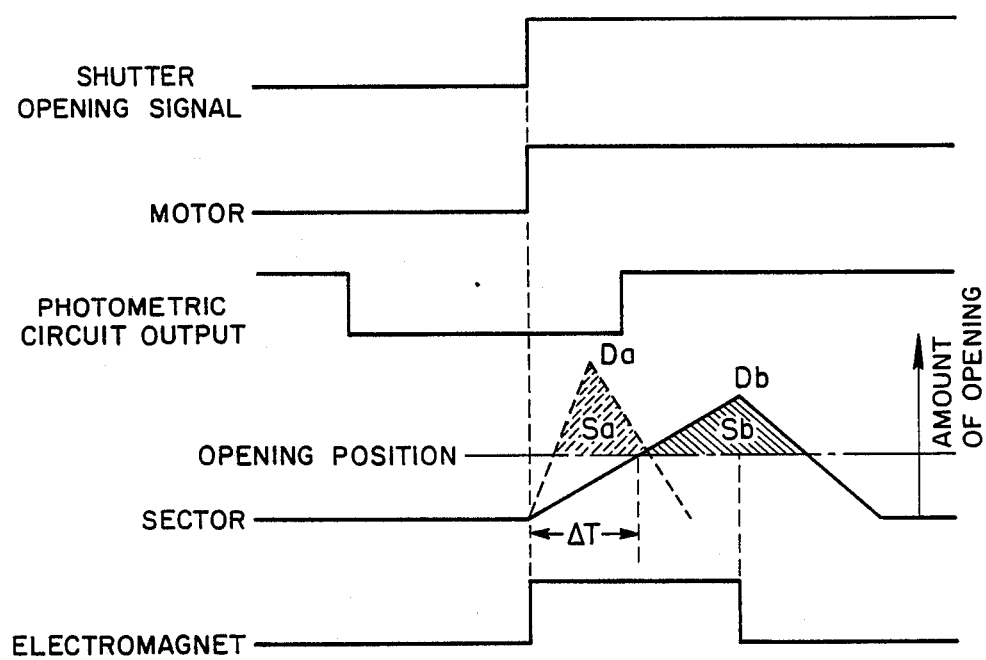
FIG. 2 is a waveform diagram showing operation of the shutter control device.

Operation of the device thus constructed will be described with reference to the timing diagram of FIG. 2.

When the shutter release button is depressed to a first stage, the brightness of the object is detected by the light detector 16a through the hole 4a of the sector 4, whereupon the exposure calculating circuit 18 calculates an amount of exposure EX suitable for photographing the object based on the film sensitivity data and brightness data. A shutter closing time Da corresponding to the calculated exposure amount EX is read out from the exposure data memory circuit 19 and is preset in the shutter aperture closing control circuit 20. Upon further depression of the shutter release button to a next stage, the switch control circuit 22 issues a shutter opening command signal to rotate the motor 3 and energize the electromagnet 7 to attract the drive plate 1. In response to the shutter opening signal, the gate 11a of the sector opening time measuring circuit 11 is opened to enable the counter 11b to start counting the clock signal CK2. The motor 3 rotates at a rotational speed dependent on the voltage of a battery (not shown) for turning the sector 4 from its home position to an opening position. When the sector 4 starts to open and the recess 4b is brought in registration with the light detector 16a during the above turning movement, light is again insoliated on the light detector 16a, causing a level change of the output signal from the photometric circuit 16. In response to this level change, the sector opening time measuring circuit 11 closes the gate 11a to shut off the clock signal CK2 applied to the counter 11b. The number of clock pulses counted by the sector opening time measuring circuit 11 represents the rotational speed of the motor 3. The corrective amount determining circuit 12 selects a clock signal fm of a high frequency when the measured opening time $\Delta T$, i.e., the time required until the aperture is opened, is short, and selects a clock signal fm of a low frequency when the time $\Delta T$ required until the aperture is opened, is long. Namely, the selected frequency fm is inversely proportional to the measured opening time $\Delta T$. The corrective amount determining circuit 12 applies the selected clock signal fm to the shutter closing control circuit 20. The time required for the shutter closing control circuit 20 to reach counting-up the stored data Da is reduced in inverse proportion to the selected frequency fm, and, as a result, the time when the sector 4 is closed is extended or delayed in proportion to the time $\Delta T$.

At a time Db when the product of the amount of opening and the opening time (indicated by an area Sb) is equal to the amount of exposure determined by the exposure calculating circuit 18 (indicated by an area Sa), the shutter aperture closing control circuit 20 reaches its counting-up, thereby de-energizing the electromagnet 7 to close the sector 4. Thus, a shortage of the opening of the aperture due to a drop of the battery voltage is compensated for by increasing the time internal during which the sector is opened.

Figure 3:
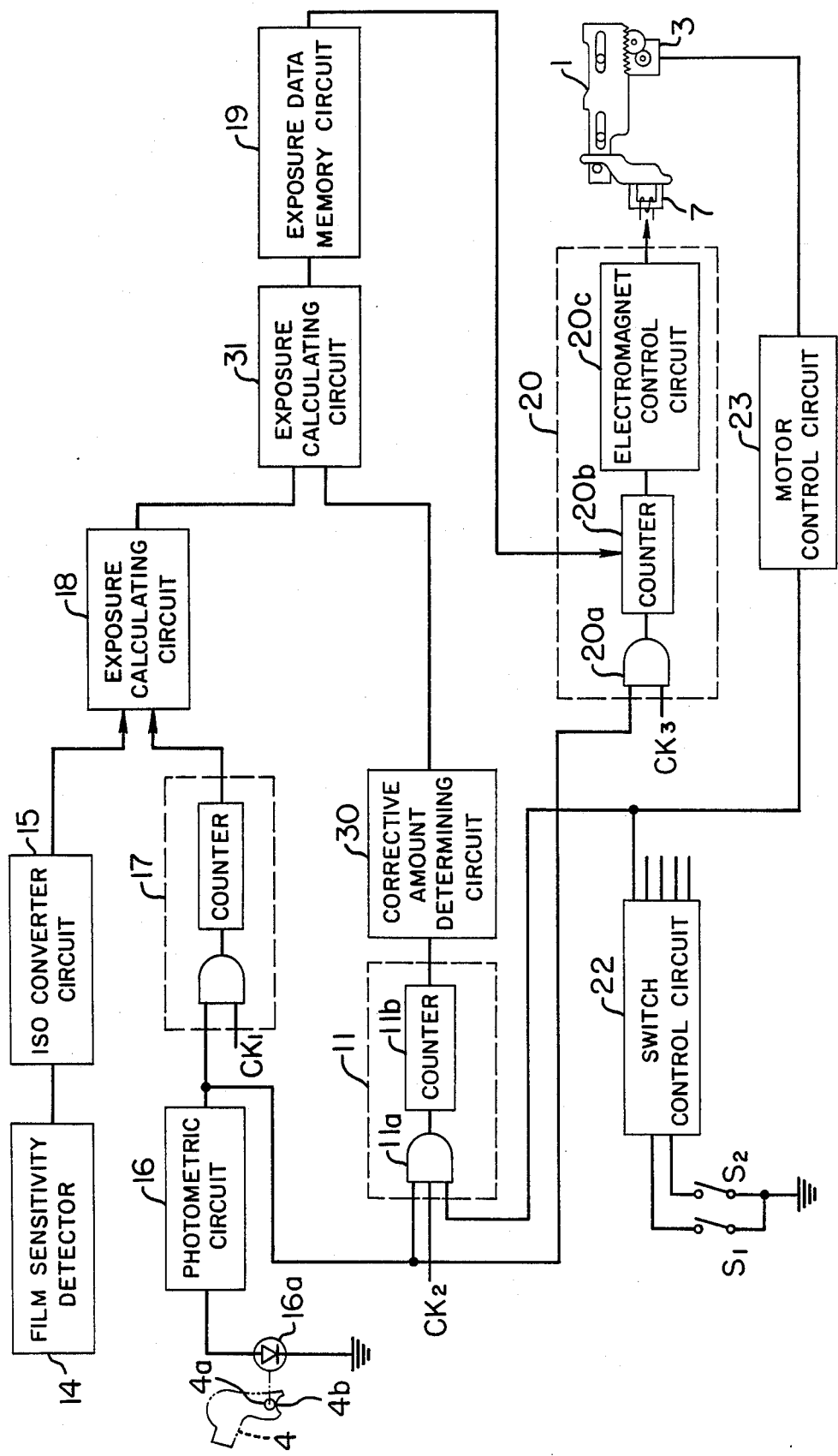
FIG. 3 is a block diagram of a shutter control device according to another embodiment of the present invention.

FIG. 3 shows a second embodiment of the present invention. A corrective amount determining circuit 30 is responsive to a signal from the shutter opening time measuring circuit 11 for converting this signal into an exposure amount $\Delta EX$, which is applied to a correction calculating circuit 31. The correction calculating circuit 31 adds a corrective exposure amount $\Delta EX$ to the exposure amount EX from the exposure calculating circuit 18, and an access signal to the exposure data memory circuit 19 based on the sum.

When the shutter release button is depressed to a first stage, the brightness of the object is detected by the light detector 16a through the hole 4a of the sector 4, whereupon the exposure calculating circuit 18 calculates an amount of exposure EX suitable for photographing the object based on the film sensitivity data and brightness data. Upon further depression of the shutter release button to a next stage, the switch control circuit 22 issues a shutter opening command signal to rotate the motor 3 and energize the electromagnet 7 to attract the drive plate 1. In response to the shutter opening signal, the gate 11a of the sector opening time measuring circuit 11 is opened to enable the counter 11b to start counting the clock signal CK2. The motor 3 rotates at a rotational speed dependent on the voltage of a battery (not shown) for turning the sector 4 from its home position to an opening position. When the sector 4 starts to open and the recess 4b is brought into registration with the light detector 16a during the above turning movement, light is again passed to the light detector 16a, causing the level change in the output signal from the photometric circuit 16. In response to this level change, the sector opening time measuring circuit 11 closes the gate 11a to complete the measurement of the opening time $\Delta T$. Based on the measured time $\Delta T$, the corrective amount determining circuit 30 supplies a signal representative of a corrective exposure amount $\Delta EX$ to the correction calculating circuit 31, which adds the exposure amount EX to the corrective exposure amount $\Delta EX$ to obtain a corrected exposure amount $EX' = EX + \Delta EX$. The correction calculating circuit 31 then specifies a shutter closing time Db corresponding to the corrected exposure amount EX' in the exposure data memory circuit 19, and sets the shutter closing time Db in the counter 20b of the shutter aperture closing control circuit 20. At the same time, the counter 20b starts counting a clock signal CK3 of a constant frequency. Even when a shutter aperture closing time Da corresponding to the exposure amount EX calculated by the exposure calculating circuit 18 is reached as the motor 3 further rotates, the shutter aperture closing control circuit 20 cannot issue a counting-up signal since the time Db corresponding to the corrected exposure amount $EX' = EX + \Delta EX$ is preset therein. Therefore, at a time when the product of the amount of opening and the opening time (indicated by the area Sb in FIG. 2) is equal to the amount of exposure determined by the exposure calculating circuit 18 (indicated by the area Sa in FIG. 2) as a result of further rotation of the motor 3 for a time corresponding to the time $\Delta T$ required until the aperture is opened, the shutter aperture closing control circuit 20 reaches its counting-up, closing the sector 4. Thus, a reduction in the opening of the aperture due to a drop of size the battery voltage is compensated for by increasing the time interval during which the sector is kept open.

In the illustrated embodiment, the aperture is closed by actuating the sector lever 6 in response to de-energization of the electromagnet. However, the present invention is also applicable to a shutter device of the type in which the motor is reversed to close the aperture.

While the time when the sector starts to open the aperture is detected by the photometric light detector in the above embodiments, such time may be detected by any of various other detectors such as a limit switch.

With the arrangement of the present invention, the time interval after the start operation of the motor to open the shutter until the sector starts to form the aperture is measured, and the timing to issue a shutter aperture closing control signal is adjusted according to the measured time interval. Therefore, accurate exposure can be obtained irrespective of changes in the battery voltage, and the battery energy can be effectively utilized until the end of its service life.

Although certain preferred embodiments have been shown and described, it should be understood that many changes and modifications may be made therein without departing from the scope of the appended claim.

Figure 7:
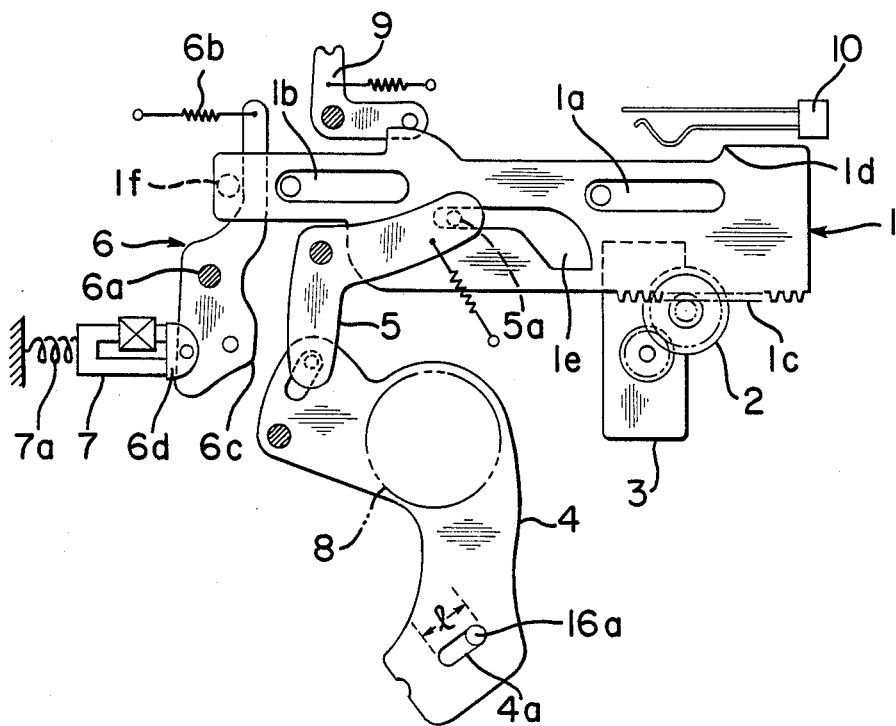
FIG. 7 is a plane view of a shutter mechanism to which the present invention is applied.

FIG. 7 shows a shutter mechanism in which a third embodiment of the present invention is applied. The shutter mechanism includes a drive plate 1 movably mounted by pins on a fixed base plate (not shown) through slots 1a, 1b formed in the drive plate 1. The drive plate 1 has a rack 1c meshing with a pinion 2 for receiving a driving force from a drive motor 3, and a projection 1d for closing a switch 10 which selects, at a time, one of a focusing mode and an exposure mode. The drive plate 1 also has a cam grove 1e for rendering a sector 4 inoperative in the focusing mode and for turning the sector 4 dependent on the interval of travel of the drive plate 1 in the exposure mode, the cam grove 1e being composed of a horizontal portion extending in the direction in which the drive plate 1 is movable and an oblique portion contiguous to the horizontal portion. The sector 4 covers an aperture opening 8 and is operatively coupled to a sector lever 5 which supports on the arm end thereof a pin 5a inserted in the cam groove 1e. The sector 4 may be plural.

A shutter closing lever 6 is angularly movably mounted on the fixed base plate by means of a shaft 6a and is normally urged by a spring 6b to turn counterclockwise about the shaft 6a. The shutter closing lever 6 has a projection 6c disposed on one lower side thereof and facing the sector lever 5. An attractable member 6d is mounted on the other lower side of the shutter closing lever 6 and is attractable by an electromagnet 7 that is swingably mounted on the fixed base plate through a spring 7a. When the drive plate 1 is in a home position, an upper portion of the shutter closing lever 6 is turned clockwise by a pin 1f on the drive plate 1 to allow the attractable member 6d to be attracted to the electromagnet 7. When the electromagnet 7 is de-energized, the shutter closing lever 6 is turned counterclockwise under the resiliency of the spring 6b to cause the projection 6c to actuate the sector lever 5 counterclockwise, thereby closing the sector 4.

The sector 4 has a groove 4a formed in one end thereof, the groove 4a having a length l. The groove 4a is positioned such that when the sector 4 is stopped in its closed position, the groove 4a registers with a light detector 16a for measuring the brightness of an object to be photographed. A rangefinder device includes a scanning member 9 which is angularly movable by a slanted surface on an upper edge of the drive plate 1.

Figure 5:
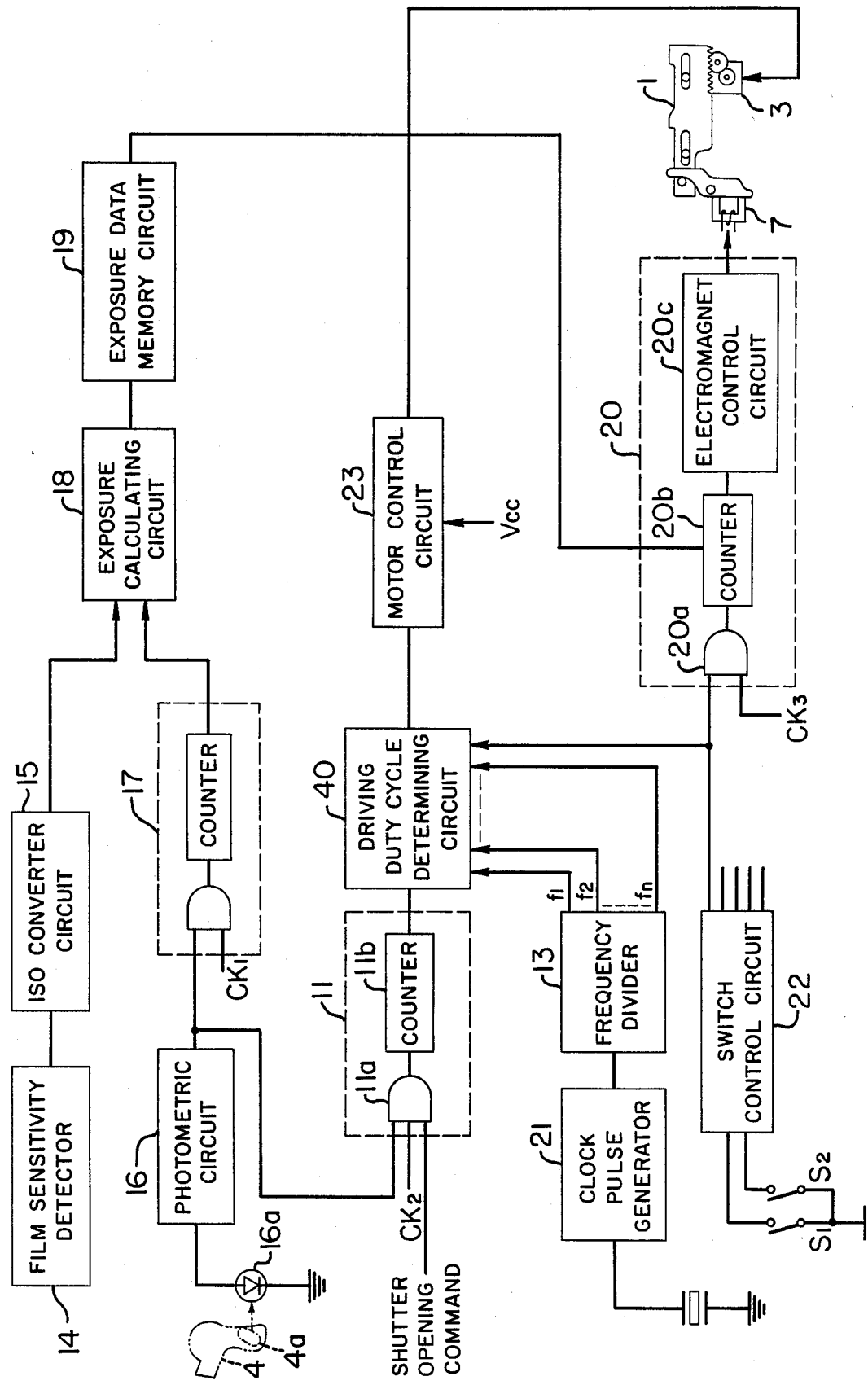
FIG. 5 is a block diagram of a speed control device according to another embodiment of the present invention.

FIG. 5 shows a shutter control device according to the present invention. The shutter control device has a circuit 11 for detecting the rotational speed of the motor, the circuit 11 including an AND gate 11a receptive of a shutter driving signal, a clock signal, and a signal from a photometric circuit 16, and a counter 11b for counting the clock signal issued from the AND gate 11a. The circuit 11 operates to detect a time t rquired for the sector 4 to be displaced through the distance l which corresponds to the length of the groove 4a. A driving duty cycle determining circuit 40 selects a preset basic duty cycle signal when a shutter opening command is issued from a switch control 22, and determines a driving duty cycle and issues the same to a motor control circuit 23 in response to a signal from the motor speed detecting circuit 11. An exposure calculating circuit 18 calculates an amount of exposure based on film sensitivity data from a film sensitivity detecting circuit 14 and object brightness data from the photometric circuit 16, and provides an access signal to an exposure data memory circuit 19. The exposure data memory circuit 20 has exposure amounts EX1, EX2, ... EXn as addresses and stores, as data, shutter closing timings D1, D2, ... Dn (see Table 1 below) corresponding to the exposure amounts, respectively.

TABLE 1

| Address | EX1 | EX2 | EX3 | ... | ... | EXn |
|---------|-----|-----|-----|-----|-----|-----|
| Data    | D1  | D2  | D3  |     |     | Dn  |

A shutter aperture closing control circuit 20 includes an AND gate 20a which is opened to pass clock pulses CK3 in response to the shutter opening command signal from the switch control circuit 22 upon depression of a shutter release button, a presettable counter 20b for setting the selected shutter closing time data from the exposure data memory circuit 19, and an electromagnet control circuit 20c for de-energizing the electromagnet 7 in response to a counting-up signal from the presettable counter 20b.

A frequency-divider circuit 13 generates motor driving basic frequency signals f1, f2, ... fn for deciding the duty of the motor driving signal, and clock signals CK1, CK2, CK3 for use in the respective countors. An ISO converter circuit 15 converts the film sensitivity data from the circuit 14 into an ISO value, and an analog-to-digital converter 18 converts a photometric signal into a corresponding digital signal. A clock pulse generator 21 generates clock pulses applied to the frequency-divider circuit 13 in response to oscillation of a crystal resonator.

Figure 6:
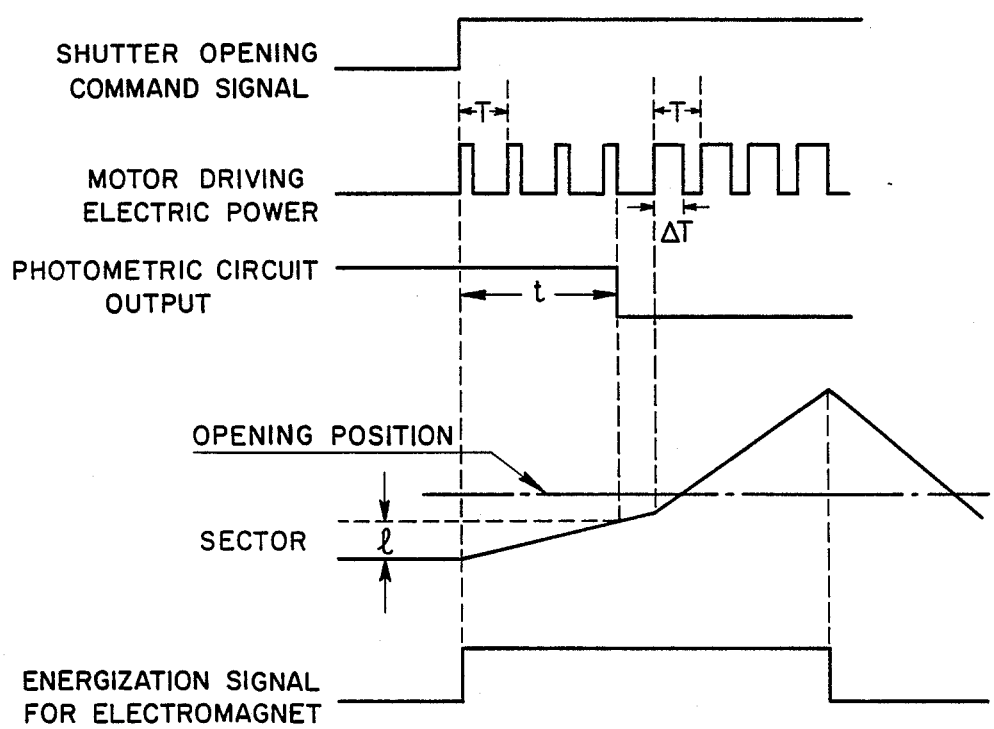
FIG. 6 is a waveform diagram showing operation of the speed control device.

Operation of the device thus constructed will be described with reference to the waveform diagram of FIG. 6.

When the shutter release button is depressed to a first stage, the brightness of the object is detected by the light detector 16a through the groove 4a of the sector 4, whereupon the exposure calculating circuit 18 calculates an amount of exposure suitable for photographing the object based on the film sensitivity data and brightness data. Upon further depression of the shutter release button, the switch control circuit 22 issues a shutter opening command signal effective to enable the driving duty cycle determining circuit 40 issue a basic duty cycle signal for starting the motor 3 to rotate and effective to energize the electromagnet 7 to attract the drive plate 1. At the same time, the gate 11a of the motor speed detecting circuit 11 is opened to enable the counter 11b to count the clock signal CK2. As the sector 4 starts to turn for the distance l corresponding to the length of the groove 4a, the light that has been applied to the light detector 16a is now shut off by the sector 4, whereupon the gate 11a is closed, cutting off the clock signal CK2 applied to the counter 11b. The count of the counter 11b, which indicates the counted number of clock pulses, is representative of the time required for the sector 4 to move the distance l with driving electric power of a basic duty cycle, i.e., representative of the rotational speed of the motor 3 depending on the battery voltage. The driving duty cycle determining circuit 40 calculates a driving duty cycle based on the count of the counter 11b, i.e., the rotational speed of the motor 3, and enables the motor control circuit 23 to regulate the driving electric power supplied to the motor 3.

More specifically, when the rotational speed of the motor at the basic duty cycle is low, the output voltage from the battery is low. Therefore, the time ΔT in which the motor 3 is energized per cycle T is increased to increase the average driving voltage applied to the motor 3. When the rotational speed of the motor is high, the energization time ΔT is reduced to lower the average driving time. During a non-energization period T−ΔT, no electric power is consumed since the current from the battery is cut off.

The motor 3 is therefore rotated at a normal speed under a constant average driving voltage irrespective of variations in the voltage of the battery, thereby allowing an exposure to be carried out according to the brightness of the object. At the time an aperture corresponding to the amount of exposure is formed, the shutter aperture closing control circuit 20 undergoes counting-up, thereby de-energizing the electromagnet to close the shutter.

In the illustrated embodiment, the aperture is closed by actuating the sector lever in response to de-energization of the electromagnet. However, the present invention is also applicable to a shutter device of the type in which the motor is reversed to close the aperture.

While the rotational speed of the motor is detected by the photometric light detector in the above embodiment, a separate speed detecting means or a number of rotation detecting means may be disposed on any of the members ranging from the motor shaft to the sector for detecting the rotational speed or numbers of the motor rotation.

With the arrangement of the present invention, the rotational speed of the motor is detected during an initial period of opening movement of the shutter, and the driving voltage for the motor is controlled on the basis of the detected rotational speed. Therefore, the shutter can be driven at a constant speed for accurate control of an amount of exposure irrespective of variations in the battery voltage. Inasmuch as the motor driving voltage is controlled by the time duration of energization, the rotational speed of the motor can be adjusted without a wasteful consumption of the electric power, and no excessive margin is necessary for the power supply voltage.

Although certain preferred embodiments have been shown and described, it should be understood that many changes and modifications may be made therein without departing from the scope of the appended claims.

What is claimed is:

1. A device for controlling a camera shutter having a shutter driving motor and sector means driven by the shutter driving motor to effect opening and closing of a shutter aperture, the device comprising: detecting means for detecting a rotational speed of the shutter driving motor after the shutter driving motor has started to rotate and before the sector means effects the opening of the shutter aperture; correcting means for correcting an amount of exposure based on the detected rotational speed of the shutter driving motor; and means for determining a shutter aperture closing timing according to a signal from the correcting means.

2. A device according to claim 1; wherein the detecting means includes means for detecting a time interval during which the shutter driving motor drives the sector means from an initial position to a predetermined position.

3. A device according to claim 1; wherein the detecting means includes means for detecting a time interval during which the shutter driving motor undergoes a predetermined number of rotations.

4. A device for controlling a rotational speed of a shutter driving motor to drive sector means to effect opening and closing of a shutter aperture in a camera, the device comprising: means for detecting the rotational speed of the motor after the motor has started to rotate and before the sector means effects the opening of the shutter aperture; and means for varying a duty cycle of a driving signal applied to the motor according to the detected rotational speed to correct the rotational speed of the motor during the opening and closing of the shutter aperture.

5. A device for controlling a camera shutter having a shutter driving motor and sector means driven by the shutter driving motor to effect opening and closing of a shutter aperture, the device comprising: means for detecting a time interval after the shutter driving motor has started to rotate until the sector means effects opening of the shutter aperture; correcting means for correcting an amount of exposure based on the detected time interval; and means for determining a shutter aperture closing timing according to a signal from the correcting time.

6. In a camera having shutter means actuatable to undergo opening movement to open an aperture to effect an exposure operation according to a given exposure value, and rotary means rotatable at a variable rotational speed which varies during the course of use of the camera for actuating the shutter means: detecting means operative after the rotary means starts rotating and before the shutter means is actuated to undergo its opening movement for detecting the rotational speed of the rotary means; and adjusting means for adjusting the operation of the shutter mans in accordance with the detected rotational speed of the rotary means to thereby enable the shutter means to effect the exposure operation at the given exposure value.

7. A camera according to claim 6; including determining means for determining the exposure value according to the brightness of an object to be photographed.

8. A camera according to claim 7; wherein the determining means includes means for determining the exposure value according to the sensitivity of a film loaded in the camera.

9. A camera according to claim 7; wherein the shutter means includes sector means actuatable for sequentially undergoing opening movement to open an aperture and closing movement to close the aperture to thereby complete the exposure operation.

10. A camera according to claim 9; wherein the determining means includes means for determining a closing timing effective to switch the sector means from the opening movement to the closing movement.

11. A camera according to claim 10; wherein the shutter means includes initiating means for initiating the closing movement according to the closing timing.

12. A camera according to claim 10; wherein the adjusting means includes delaying means operative when the detected rotational speed is smaller than a pre-established normal rotational speed for delaying execution of the switching from the opening movement to the closing movement according to the detected rotational speed.

13. A camera according to claim 10; wherein the adjusting means includes calculating means operative when the detected rotational speed is smaller than a pre-established normal rotational speed for calculating a corrective closing timing later than the determined closing timing according to the detected rotational speed.

14. A camera according to claim 6; including applying means for applying a given drive power to the rotary means to drive the rotary means.

15. A camera according to claim 14; wherein the adjusting means includes increasing means operative when the detected rotational speed is smaller than a pre-established normal rotational speed for increasing the drive power applied to the rotary means during the exposure operation to thereby accurately achieve the given exposure value.

16. A camera according to claim 6; wherein the shutter means includes sector means displaceably driven by the rotary means in response to the rotational speed thereof through a non-operative region without opening the aperture and through an operative region for opening the aperture.

17. A camera according to claim 16; wherein the detecting means includes measuring means for measuring a time interval while the sector means is driven to undergo a predetermined amount of displacement through the non-operative region.

18. A camera according to claim 17; wherein the detecting means includes optical detecting means for optically detecting the displacement of the sector means in cooperation with the measuring means.

19. A camera according to claim 18; wherein the optical detecting means includes a photo detector opposed to the sector means for detecting incident light from the object to be photographed when the sector means is displaced relative to the photo detector.

20. A camera according to claim 6; wherein the rotary means comprises a motor; and the detecting means includes measuring means for measuring a time interval while the motor is driven to undergo a predetermined number of rotations.

21. A camera according to claim 6; including a battery for supplying electric power to the rotary means to effect rotation thereof, the battery exhibiting a variable power discharge characteristic during the course of power discharge to thereby cause the motor to rotate at a variable rotational speed.

* * * * *